United States Patent
Shin et al.

(10) Patent No.: US 9,971,201 B2
(45) Date of Patent: May 15, 2018

(54) LIQUID CRYSTAL DISPLAY

(71) Applicant: Samsung Display Co., LTD., Yongin, Gyeonggi-Do (KR)

(72) Inventors: Cheol Shin, Yongin (KR); Haksun Chang, Yongin (KR); Kaeun Kim, Yongin (KR); Kichul Shin, Yongin (KR); Hokil Oh, Yongin (KR); Sehyun Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 48 days.

(21) Appl. No.: 14/709,729

(22) Filed: May 12, 2015

(65) Prior Publication Data

US 2015/0355511 A1 Dec. 10, 2015

(30) Foreign Application Priority Data

Jun. 5, 2014 (KR) .................. 10-2014-0068581

(51) Int. Cl.
*G02F 1/1337* (2006.01)
*G02F 1/1343* (2006.01)

(52) U.S. Cl.
CPC .. *G02F 1/133707* (2013.01); *G02F 1/134309* (2013.01); *G02F 1/134336* (2013.01); *G02F 2001/134318* (2013.01)

(58) Field of Classification Search
CPC ............. G02F 1/0316; G02F 1/133707; G02F 1/1343; G02F 1/134309; G02F 1/134327; G02F 1/134363; G02F 1/13439; G02F 1/136; G02F 1/136286; G02F 1/1393; G02F 1/1395; G02F 1/155; G02F 1/218; G02F 2001/134318; G02F 2001/134345; G02F 2001/134372; G02F 2001/134381; G02F 2001/1357; G02F 2001/136218; G02F 2001/13629; G02F 2001/136295; G02F 2001/1552; G02F 2001/1555; G02F 2001/1557; G02F 2201/12; G02F 2201/121; G02F 2201/122; G02F 2201/123; G02F 2201/124; G02F 2201/14; G02F 2202/10; G02F 1/134336; G02F 1/133753; G02F 1/3775; G02F 2001/13787;
(Continued)

(56) References Cited

U.S. PATENT DOCUMENTS 6,654,090 B1 * 11/2003 Kim .................. G02F 1/133753
349/106
2002/0054265 A1 * 5/2002 Song .................. G02F 1/133707
349/143
(Continued)

*Primary Examiner* — Edward Glick
*Assistant Examiner* — Shan Liu
(74) *Attorney, Agent, or Firm* — H.C. Park & Associates, PLC

(57) ABSTRACT

A liquid crystal display is provided. The liquid crystal display includes a pair of substrates; and a pixel electrode and a common electrode provided on the pair of substrates and facing each other. The pixel electrode includes: a cross pattern at a center thereof; a plate electrode surrounding the cross pattern; and a plurality of minute branch electrodes extending in a diagonal direction outward from the plate electrode. A partial extension structure of the plate electrode is formed in at least a partial boundary region located between the plate electrode and the plurality of minute branch electrodes.

19 Claims, 17 Drawing Sheets

(58) Field of Classification Search
CPC ... G09G 2300/0421; G09G 2300/0426; G09G 2300/0439; G09G 3/3659; H01L 23/49534; H01L 27/124; H01L 27/3276; H01L 27/3279; H01L 27/329; H01L 27/3297; H01L 2933/0016
USPC ........................................................ 349/129
See application file for complete search history.

(56) References Cited

U.S. PATENT DOCUMENTS

| | | | |
|---|---|---|---|
| 2004/0119924 A1 | 6/2004 | Takeda et al. | |
| 2004/0227884 A1* | 11/2004 | Wu | G02F 1/134336 349/130 |
| 2004/0233360 A1* | 11/2004 | Yoshida | G02F 1/133555 349/114 |
| 2005/0231671 A1* | 10/2005 | Jun | G02F 1/1393 349/139 |
| 2007/0013848 A1* | 1/2007 | Hsu | G02F 1/133707 349/129 |
| 2007/0229746 A1* | 10/2007 | Kim | G02F 1/134309 349/139 |
| 2008/0024706 A1 | 1/2008 | Yang et al. | |
| 2009/0015774 A1* | 1/2009 | Asakura | G02F 1/134363 349/141 |
| 2009/0256985 A1* | 10/2009 | Jung | G02F 1/1368 349/48 |
| 2011/0149223 A1* | 6/2011 | Tsao | G02F 1/133707 349/141 |
| 2012/0026438 A1 | 2/2012 | Choi et al. | |
| 2012/0249940 A1* | 10/2012 | Choi | G02F 1/133753 349/123 |
| 2012/0281172 A1* | 11/2012 | Park | G02F 1/133707 349/123 |
| 2013/0033668 A1* | 2/2013 | Yao | G02F 1/133707 349/143 |
| 2013/0107185 A1* | 5/2013 | Chen | G02F 1/133707 349/142 |
| 2013/0201432 A1* | 8/2013 | Yun | G02F 1/134309 349/123 |
| 2013/0285891 A1* | 10/2013 | Zhang | G02F 1/133707 345/90 |
| 2013/0329177 A1* | 12/2013 | Hsieh | G02F 1/134309 349/141 |
| 2014/0267994 A1 | 9/2014 | Ryu et al. | |
| 2015/0049288 A1* | 2/2015 | Yeh | G02F 1/133707 349/138 |

\* cited by examiner

LIQUID CRYSTAL DISPLAY

CLAIM OF PRIORITY

This application claims the benefit of Korean Patent Application No. 10-2014-0068581, filed on Jun. 5, 2014, in the Korean Intellectual Property Office, the disclosure which is incorporated herein in its entirety by reference.

BACKGROUND OF THE INVENTION

Field of the Invention

One or more embodiments of the present invention generally relate to liquid crystal displays, and more particularly, to liquid crystal displays that are designed to have improved transmittance.

Description of the Related Art

Displays are required in computer monitors, televisions, mobile phones, portable terminals, and the like. Examples of the most widely used flat panel displays include liquid crystal displays and organic light-emitting displays.

A liquid crystal display is one of the most widely used flat panel displays and includes two flat panels, in which a pixel electrode and a common electrode are formed, and a liquid crystal layer interposed between the two flat panels. The liquid crystal display displays an image by controlling the polarization of light passing through the liquid crystal layer, by applying a voltage to the pixel electrode or the common electrode to form an electric field in the liquid crystal layer to change the alignment of liquid crystal molecules of the liquid crystal layer.

Vertically aligned mode liquid crystal displays, in which the major axes of liquid crystal molecules are vertically aligned with respect to a display panel when no voltage is applied thereto, have been developed.

In a vertically aligned mode liquid crystal display, it is important to ensure a wide viewing angle, and to this end, a cut-out portion such as a minute slit is formed in an electrode for driving a pixel. Since the cut-out portion determines the tilt direction of liquid crystal molecules, a viewing angle may be widened by disposing properly the cut-out portion such that the tilt direction of the liquid crystal molecules is distributed to various directions. When a minute slit is formed in the electrode to provide a plurality of minute branch electrodes, an aperture ratio of the liquid crystal display may be reduced and the transmittance thereof may be degraded accordingly.

SUMMARY OF THE INVENTION

One or more embodiments of the present invention include liquid crystal displays that are designed to ensure transmittance.

Additional aspects will be set forth in part in the description which follows and, in part, will be apparent from the description, or may be learned by practice of the presented embodiments.

According to one or more embodiments of the present invention, a liquid crystal display includes a pair of substrates, and a pixel electrode and a common electrode provided on the pair of substrates and facing each other. The pixel electrode includes a cross pattern formed at a center of the pixel electrode, a plate electrode surrounding the cross pattern, and a plurality of minute branch electrodes extending in a diagonal direction from the plate electrode. A partial extension structure of the plate electrode is formed in at least a partial boundary region located between the plate electrode and the plurality of minute branch electrodes.

The common electrode may include a slit pattern that is formed with a smaller width than the plate electrode at a position corresponding to the plate electrode.

The partial extension structure of the plate electrode may be formed by partially extending the plate electrode in the shape of stepping stones.

At least one slit may be located between regions that are formed by partially extending the plate electrode in the shape of stepping stones.

The partial extension structure of the plate electrode may be formed in a region where the plurality of minute branch electrodes have a maximum length.

The partial extension structure of the plate electrode may be formed in a region where the plurality of minute branch electrodes have a length greater than about 29 μm.

The plurality of minute branch electrodes may extend outward from the plate electrode or extend inward from the plate electrode and up to the cross pattern.

The plurality of minute branch electrodes may include: a plurality of first minute branch electrodes extending outward from the plate electrode; and a plurality of second minute branch electrodes extending inward from the plate electrode and up to the cross pattern, wherein the partial extension structure of the plate electrode is formed in at least a partial boundary region located between the plate electrode and at least one of the first minute branch electrode and the second minute branch electrode.

An electrode portion formed inside the slit pattern may have a diamond shape.

A distance between the slit pattern of the common electrode and a boundary between the plate electrode and the plurality of minute branch electrodes may be about 15 μm to about 30 μm.

The slit pattern may be formed such that portions of the slit pattern have different widths.

The plurality of minute branch electrodes may be formed to have a length of about 30 μm or less.

The partial extension structure of the plate electrode may be formed in the shape of stepping stones in a region where the plurality of minute branch electrodes have a length greater than about 29 μm.

According to one or more embodiments of the present invention, a liquid crystal display includes a pair of substrates, a pixel electrode disposed on one of the pair of substrates, and a common electrode disposed on the other of the pair of substrates. The pixel electrode includes a plate electrode, a cross pattern formed at a center of the pixel electrode, a plurality of slits formed in a diagonal direction outward from the plate electrode, and a plurality of first minute branch electrodes extending in a diagonal direction outward from the plate electrode. A partial extension structure of the plate electrode is formed in at least a partial boundary region located between the plate electrode and the plurality of first minute branch electrodes.

The partial extension structure of the plate electrode may be formed in a region where the plurality of first minute branch electrodes have a maximum length.

The partial extension structure of the plate electrode may be formed by partially extending the plate electrode in the shape of stepping stones.

The partial extension structure of the plate electrode may be formed in the shape of stepping stones in a region where the plurality of first minute branch electrodes have a length greater than about 29 μm.

The cross pattern may be formed in the shape of a slit cross pattern, a plurality of second minute branch electrodes may be further formed to extend in a diagonal direction inward from the plate electrode and up to the cross pattern, and a partial extension structure of the plate electrode may be further formed at a boundary between the plate electrode and the plurality of second minute branch electrodes.

A first subpixel region and a second subpixel region may be provided in a pixel region, and the common electrode and the pixel electrode may be formed in each of the first subpixel region and the second subpixel region.

The first subpixel region may be formed to be smaller than the second subpixel region, and the partial extension structure of the plate electrode in the first subpixel region may be formed to be smaller than the partial extension structure of the plate electrode in the second subpixel region.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
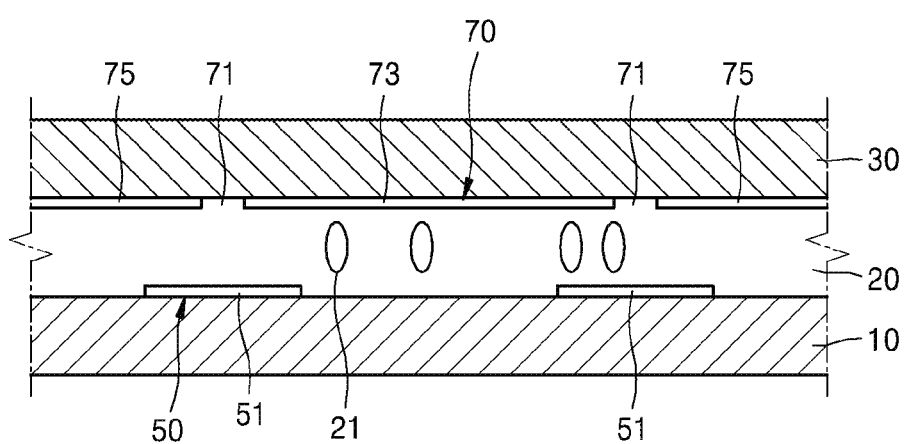
FIG. 1 is a schematic cross-sectional view of a liquid crystal display according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present invention may include various embodiments and modifications, and exemplary embodiments thereof are illustrated in the drawings and will be described herein in detail. The effects and features of the present invention and the accomplishing methods thereof will become apparent from the following description of the embodiments, taken in conjunction with the accompanying drawings. However, the prevent invention is not limited to the embodiments described below, and may be embodied in various modes.

Hereinafter, embodiments of the present invention will be described in detail with reference to the accompanying drawings. In the following description, like reference numerals denote like elements, and a redundant description thereof will be omitted.

It will be understood that although the terms "first", "second", etc. may be used herein to describe various components, these components should not be limited by these terms. These terms are only used to distinguish one component from another.

As used herein, the singular forms "a", "an" and "the" are intended to include the plural forms as well, unless the context clearly indicates otherwise.

It will be further understood that the terms "comprise", "include" and "have" used herein specify the presence of stated features or components, but do not preclude the presence or addition of one or more other features or components.

It will be understood that when a layer, region, or component is referred to as being "formed on" another layer, region, or component, it may be directly or indirectly formed on the other layer, region, or component. That is, for example, intervening layers, regions, or components may be present.

Sizes of components in the drawings may be exaggerated for convenience of description. In other words, since sizes and thicknesses of components in the drawings are arbitrarily illustrated for convenience of description, the following embodiments are not limited thereto.

A liquid crystal display according to an embodiment of the present invention includes: a pair of substrates; and a pixel electrode and a common electrode provided on the pair of substrates and facing each other. One of the pair of substrates may be a lower substrate, and the other of the pair of substrates may be an upper substrate. The pixel electrode may include: a cross pattern at a center thereof; a plate electrode surrounding the cross pattern; and a plurality of minute branch electrodes extending in a diagonal direction from the plate electrode, wherein a partial extension structure of the plate electrode may be formed in at least a partial boundary region located between the plate electrode and the plurality of minute branch electrodes. The common electrode may include a slit pattern that is formed with a smaller width than the plate electrode at a position corresponding to the plate electrode. Hereinafter, a case where the pixel electrode having the partial extension structure of the plate electrode is provided on the lower substrate and the common electrode is provided on the upper substrate will be described as an example.

Figure 2:
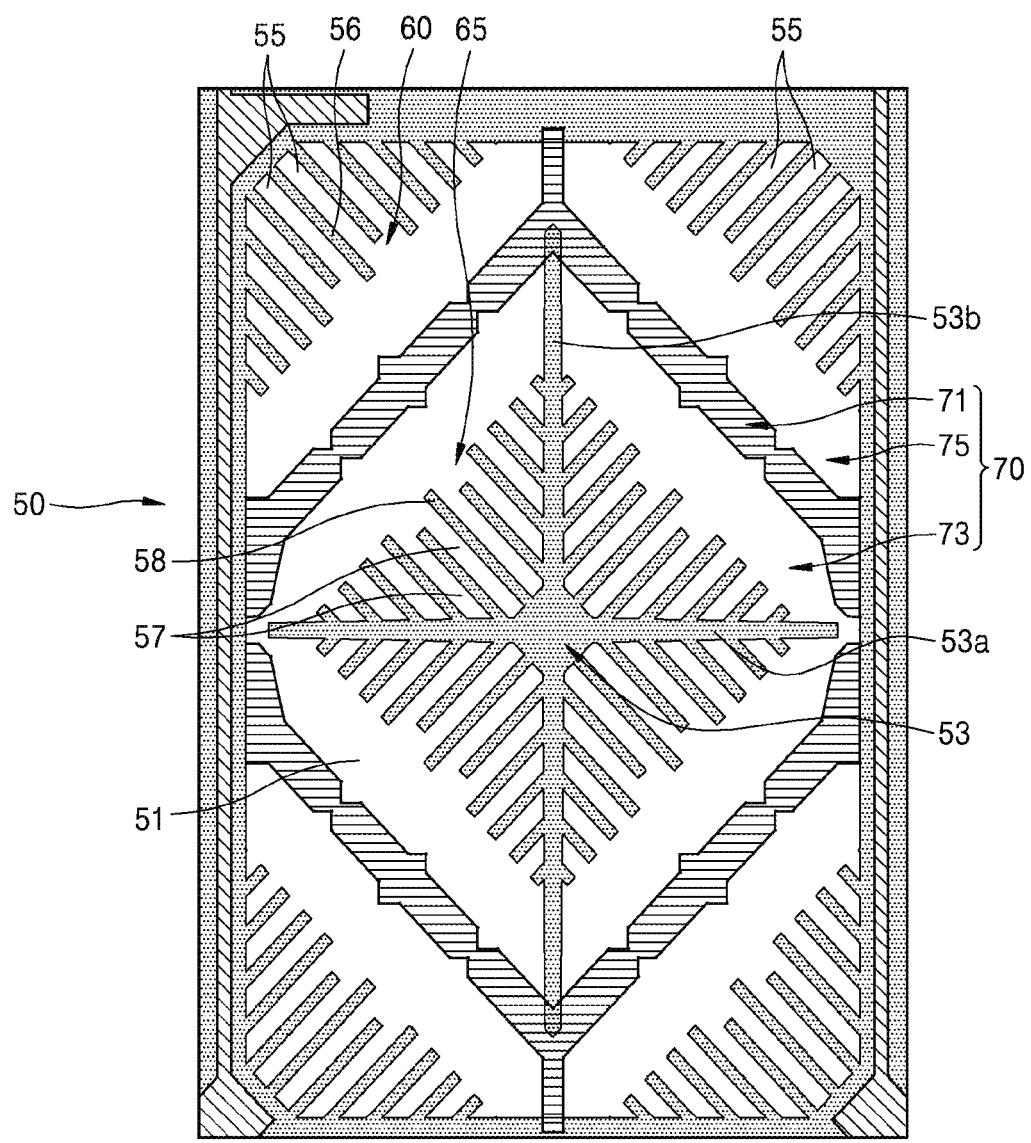
FIG. 2 illustrates an electrode structure of a liquid crystal display according to an embodiment of the present invention.
Figure 3:
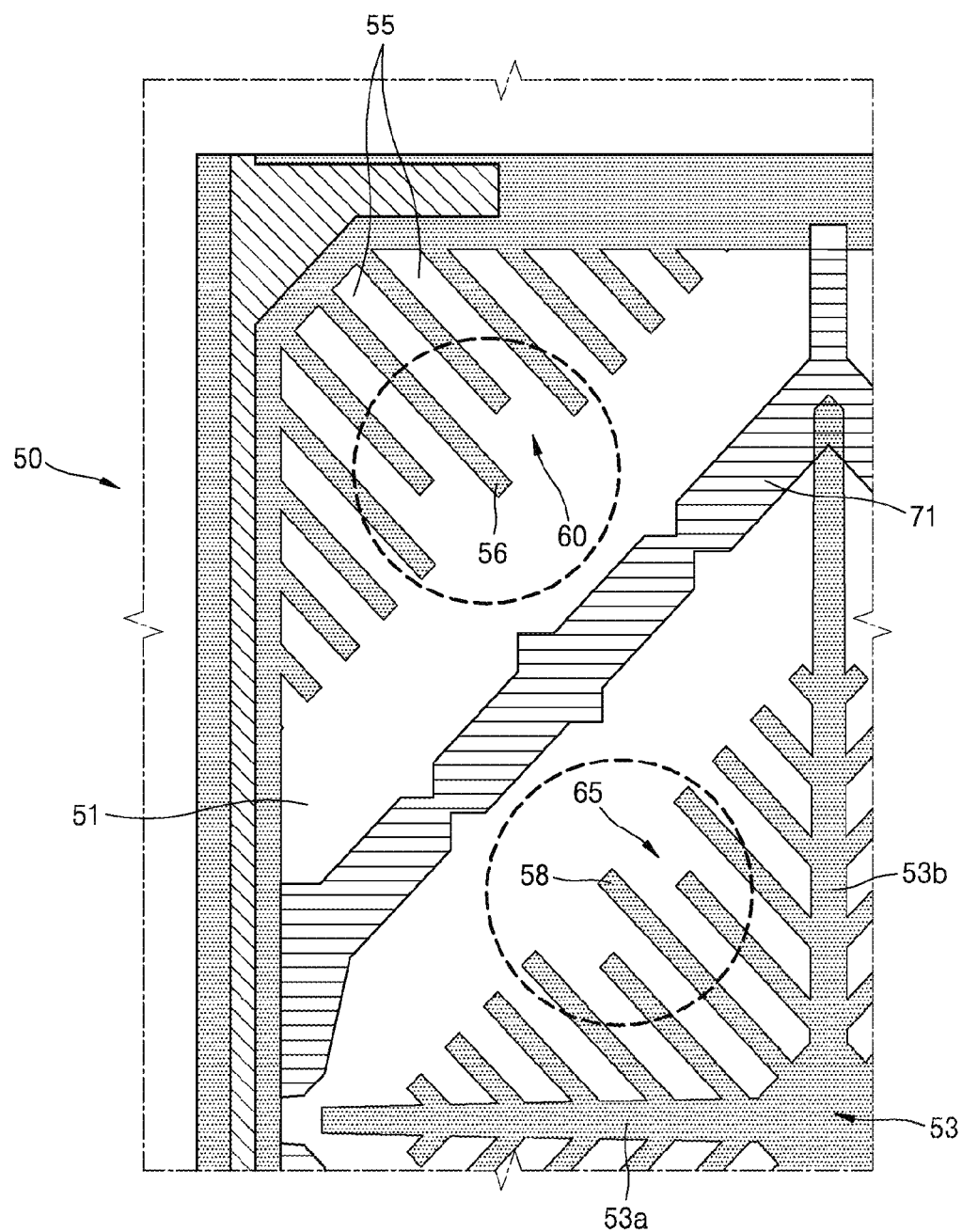
FIG. 3 is a partial enlarged view of FIG. 2.

FIG. 1 is a schematic cross-sectional view of a liquid crystal display according to an embodiment of the present invention. FIG. 2 illustrates an electrode structure of a liquid crystal display according to an embodiment of the present invention. FIG. 3 is a partial enlarged view of FIG. 2.

Referring to FIGS. 1 to 3, the liquid crystal display according to an embodiment of the present invention includes a lower substrate (e.g., first substrate) 10, an upper substrate (e.g., second substrate) 30, and a liquid crystal layer 20 interposed between the lower substrate 10 and the upper substrate 30.

The lower substrate 10 and the upper substrate 30 may be formed of an insulating substrate such as a glass or plastic substrate. An alignment layer may be formed on inner surfaces of the lower substrate 10 and the upper substrate 30, and the alignment layer may be a vertical alignment layer. A polarizer may be provided on outer surfaces of the lower substrate 10 and the upper substrate 30. In this case, transmission axes of two polarizers may be disposed to be perpendicular to each other. Herein, the liquid crystal display according to an embodiment of the present invention may be a reflection type, and in this case, the polarizer may be disposed only on a light emitting surface, for example, the outer surface of the upper substrate 30.

The liquid crystal layer 20 may be a vertically aligned mode in which the major axes of molecules of liquid crystal 21 are vertically aligned with respect to the lower substrate 10 and the upper substrate 30 when no voltage is applied thereto. For example, the liquid crystal 21 of the liquid crystal layer 20 may have negative dielectric anisotropy. When the polarizers are disposed respectively on the outer surfaces of the lower substrate 10 and the upper substrate 30 to be perpendicular to each other, light that has passed through one of the polarizers with no electric field in the liquid crystal layer 20 fails to pass through the other of the polarizers (analyzer).

For example, a pixel electrode 50 may be provided on the lower substrate 10, and a common electrode 70 may be provided on the upper substrate 30. Although a case where the pixel electrode 50 is provided on the lower substrate 10 and the common electrode 70 is provided on the upper substrate 30 will be described as an example, embodiments of the present invention are not limited thereto. Also, the lower substrate 10 and the upper substrate 30 are relative concepts used to describe the embodiments of the present invention. The embodiments of the present invention is not limited to a case where the lower substrate 10 is located at a lower side and the upper substrate 30 is located at a upper side, and from the viewpoint of a viewer, the lower substrate 10 may be located at a rear side and the upper substrate 30 may be located at a front side.

Figure 4A:
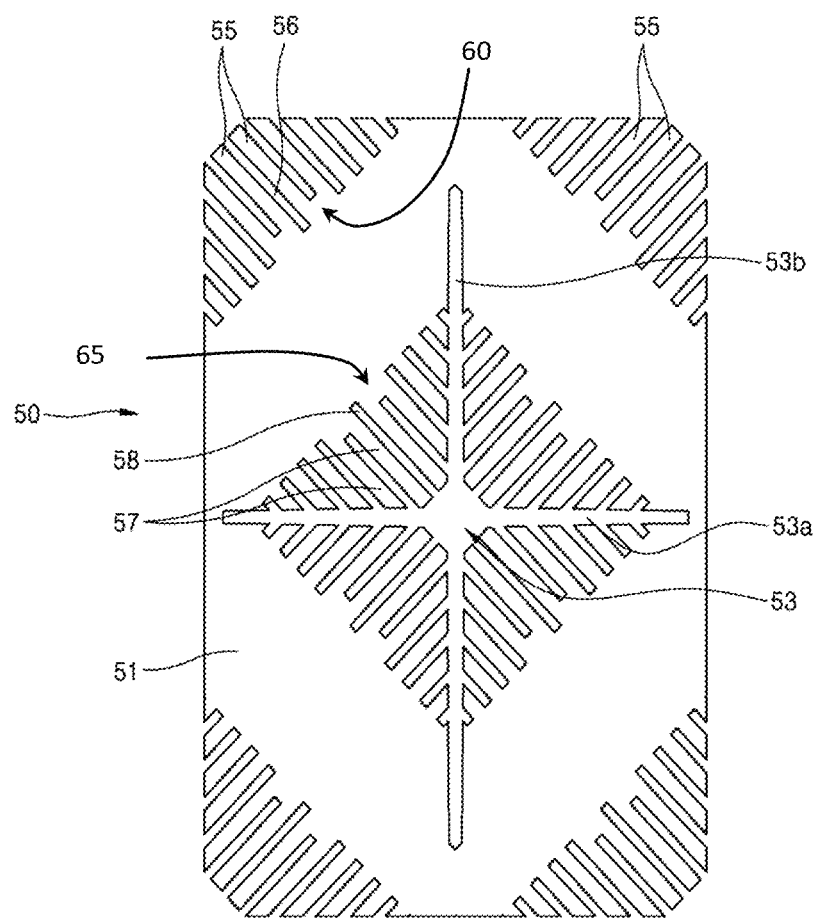
FIG. 4A illustrates a pixel electrode of FIG. 2.
Figure 4B:
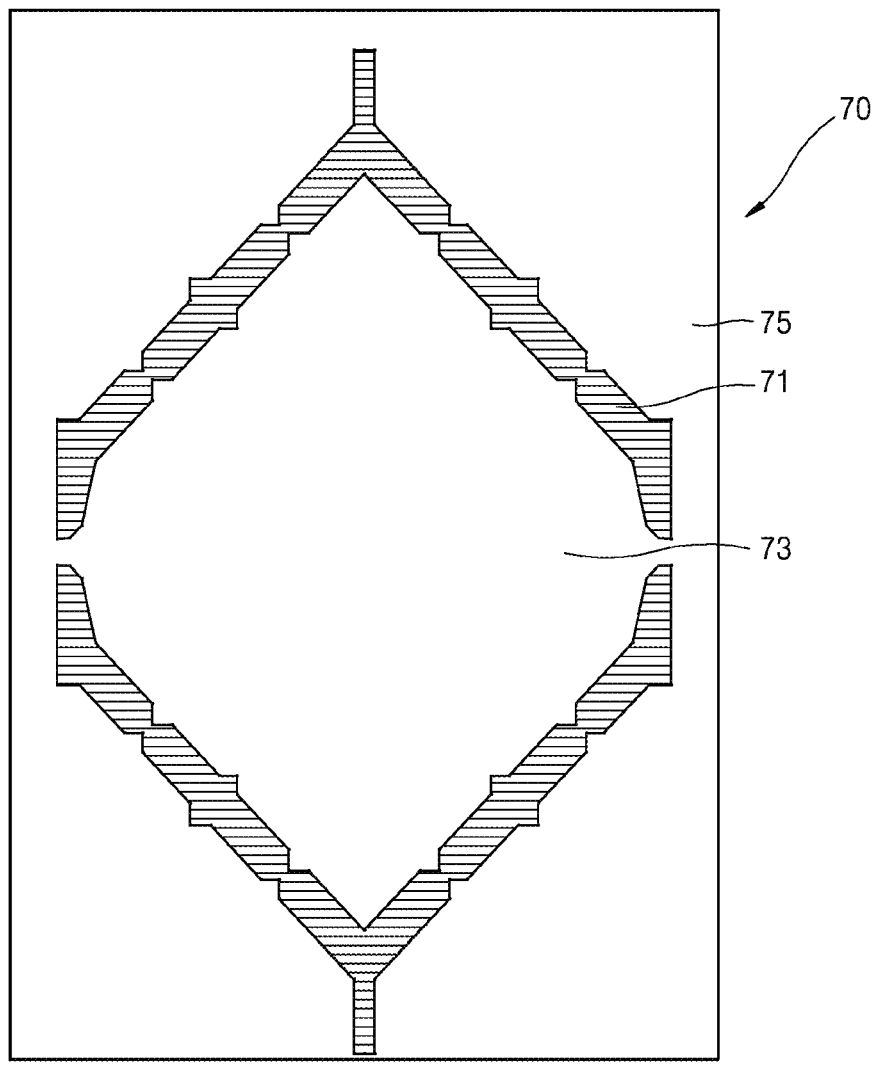
FIG. 4B illustrates a common electrode of FIG. 2.

FIGS. 2 and 3 illustrate a state where the common electrode 70 provided on the upper substrate 30 is superimposed on the pixel electrode 50 provided on the lower substrate 10. FIG. 4A illustrates the pixel electrode 50 of FIG. 2, and FIG. 4B illustrates the common electrode 70 of FIG. 2.

Referring to FIGS. 2 to 4A, the pixel electrode 50 includes: a cross pattern 53 at a center thereof; a plate electrode 51 surrounding the cross pattern 53; and a plurality of minute branch electrodes 55 and 57 extending in a diagonal direction from the plate electrode 51. First and second extension structures 60 and 65 of the plate electrode 51 may be formed in at least partial boundary regions between the plate electrode 51 and the plurality of minute branch electrodes 55 and 57.

The cross pattern 53 may be formed by crossing a horizontal slit 53a and a vertical slit 53b. The cross pattern 53 may be empty or may be filled with a material (e.g., insulating material) other than an electrode material. That is, the cross pattern 53 is electrically insulating.

The plate electrode 51 may be formed to surround the cross pattern 53 and may be formed to have, for example, a substantially diamond shape.

The plurality of minute branch electrodes 55 and 57 may extend outward from the plate electrode 51 and/or extend inward from the plate electrode 51 and up to the cross pattern 53. FIGS. 2 and 4A illustrate an exemplary case where the plurality of minute branch electrodes 55 and 57 are provided outside and inside the plate electrode 51. The plurality of minute branch electrodes 55 and 57 may include: a plurality of first minute branch electrodes 55 extending outward from the plate electrode 51; and a plurality of second minute branch electrodes 57 extending inward from the plate electrode 51 and up to the cross pattern 53.

For example, the pixel electrode 50 may include the cross pattern 53 at a center thereof and a plurality of first slits 56 formed in a diagonal direction outward from the plate electrode 51, so that the pixel electrode 50 may include the plate electrode 51 and the plurality of first minute branch electrodes 55 extending in a diagonal direction outward from the plate electrode 51. That is, the plurality of first slits 56 are interposed between the plurality of first minute branch electrodes 55 of the pixel electrode 50. Also, a plurality of second slits 58 may be formed in the cross pattern 53 in a diagonal direction to form a slit cross pattern, so that the pixel electrode 50 may include the plurality of second minute branch electrodes 57 formed to extend in a diagonal direction inward from the plate electrode 51 and up to the cross pattern 53. That is, the plurality of second slits 58 are interposed between the plurality of second minute branch electrodes 57 of the pixel electrode 50.

In this case, the first and second partial extension structures 60 and 65 of the plate electrode 51 may be formed in at least a partial boundary region located between the plate electrode 51 and at least one of the first minute branch electrode 55 and the second minute branch electrode 57. For example, the first partial extension structure 60 of the plate electrode 51 may be formed in at least a partial boundary region located between the plate electrode 51 and the plurality of first minute branch electrodes 55. Also, the second partial extension structure 65 of the plate electrode 51 may be formed in at least a partial boundary region located between the plate electrode 51 and the plurality of second minute branch electrodes 57. FIGS. 2 to 4A illustrate an exemplary case where the first and second partial extension structures 60 and 65 of the plate electrode 51 are respectively formed in at least a partial boundary region located between the plate electrode 51 and the plurality of first minute branch electrodes 55 and at least a partial boundary region located between the plate electrode 51 and the plurality of second minute branch electrodes 57. Any of the first partial extension structures 60 may be formed a region interposed by two of the plurality of first slits 56 that are not immediately adjacent to each other. Similarly, any of the second partial extension structures 65 may be formed a region interposed by two of the plurality of second slits 58 that are not immediately adjacent to each other.

As illustrated in the enlarged view of FIG. 3, the first and second partial extension structures 60 and 65 of the plate electrode 51 may be formed by partially extending the plate electrode 51 in the shape of stepping stones. In this case, at least one of the slits 56, 58 is located between regions that are formed by partially extending the plate electrode 51 in the shape of stepping stones.

For example, the first and second partial extension structures 60 and 65 of the plate electrode 51 may be formed in a region where the plurality of minute branch electrodes 55 and 57 have a maximum length. That is, when the plate electrode 51 is formed in a substantially diamond shape having the cross pattern 53 or a slit cross pattern at a center thereof, a region where the plurality of first minute branch electrodes 55 have a maximum length is a portion extending to four corners of the pixel, and a region where the plurality of second minute branch electrodes 57 have a maximum length is a portion extending from four corners of the pixel to a center of the cross pattern 53. The plate electrode 51 may be partially extended in the shape of stepping stones in a region where the plurality of minute branch electrodes 55 and 57 have a maximum length.

For example, the plurality of minute branch electrodes 55 and 57 may be formed to have a length of about 30 μm or less, and in this case, the first and second partial extension structures 60 and 65 of the plate electrode 51 may be formed in the shape of stepping stones in a region where the plurality of minute branch electrodes 55 and 57 have a length greater than, for example, about 29 μm. In this case, the first and second partial extension structures 60 and 65 of the plate electrode 51 may be formed to have a length of about 5 μm or less.

Herein, the first and second partial extension structures 60 and 65 of the plate electrode 51 may not be a portion extending to four corners of the pixel and/or a portion extending to the opposite side thereof and may be formed at other boundary positions of the plate electrode 51 and the plurality of minute branch electrodes 55 and 57.

As described above, by forming the plurality of minute branch electrodes 55 and 57 in the diagonal direction with respect to the cross pattern 53, the pixel electrode 50 is divided into four regions by the horizontal slit 53*a* and the vertical slit 53*b* and each of the four regions includes the plurality of minute branch electrodes 55 and 57 extending in the diagonal direction. Therefore, when a voltage is applied to the pixel electrode 50, the molecules of the liquid crystal 21 tilt in about four directions. In this manner, when the molecules of the liquid crystal 21 tilt in various directions, a reference viewing angle of the liquid crystal display may be increased.

As described above, when the pixel electrode 50 is formed to include the plate electrode 51 and the plurality of minute branch electrodes 55 and 57, the liquid crystal display having a high aperture ratio may be implemented. In this case, it is necessary to extend the liquid crystal control length, in order to ensure the control power of the liquid crystal 21 while applying a high aperture ratio. In order to ensure the liquid crystal control length, the plate electrode 51 and the plurality of minute branch electrodes 55 and 57 may be lengthened. When the plate electrode 51 and the plurality of minute branch electrodes 55 and 57 are lengthened, response time delay of the liquid crystal may occur. Therefor, it may be difficult to apply a method of lengthening the plate electrode 51 and the plurality of minute branch electrodes 55 and 57. Therefore, it is necessary to ensure the liquid crystal control length without response time delay of the liquid crystal.

In the liquid crystal display according to the embodiment of the present invention, since the plate electrode 51 is partially extended in the shape of stepping stones in a partial boundary region located between the plate electrode 51 and the minute branch electrodes 55 and 57, for example, a region where the minute branch electrodes 55 and 57 have a maximum strength, the liquid crystal control length may be extended without response time delay of the liquid crystal.

Referring to FIGS. 2, 3, and 4B, the common electrode 70 may include a slit pattern 71 that is formed with a smaller width than the plate electrode 51 at a position corresponding to the plate electrode 51 of the pixel electrode 50. FIGS. 2 and 3 illustrate a disposition relation between the plate electrode 51 of the pixel electrode 50 and the slit pattern 71 of the common electrode 70.

As illustrated in FIG. 4B, a common electrode portion 73 inside the slit pattern 71 may be formed to have diamond shape. In this case, a distance between the slit pattern 71 and a boundary between the plate electrode 51 and the plurality of minute branch electrodes 55 and 57 may be about 15 μm to about 30 μm. In this case, the slit pattern 71 may be formed to have one or more portions of different widths.

Due to the slit pattern 71 having a diamond shape having a width, the common electrode 70 includes the common electrode portion 73 having a substantially diamond shape and located at a center thereof and a common electrode portion 75 outside the slit pattern 71.

Figure 5A:
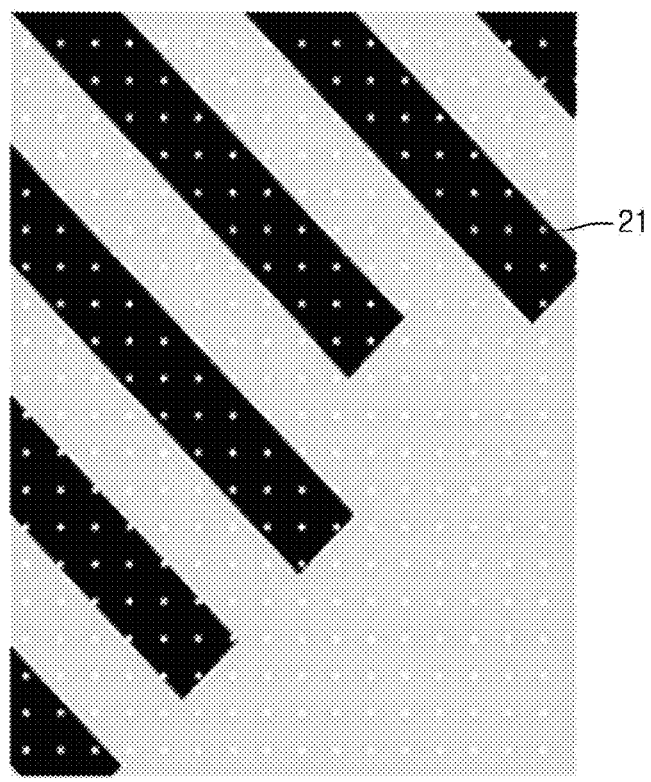
FIGS. 5A to 5C illustrate a liquid crystal (LC) director alignment change according to whether a voltage is applied when the electrode structure of FIG. 2 is provided.
Figure 5B:
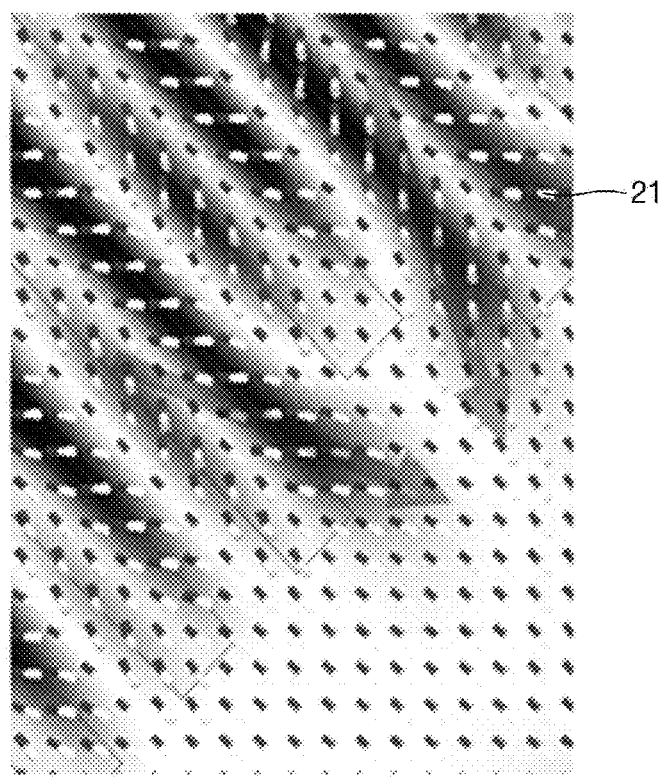
Figure 5C:
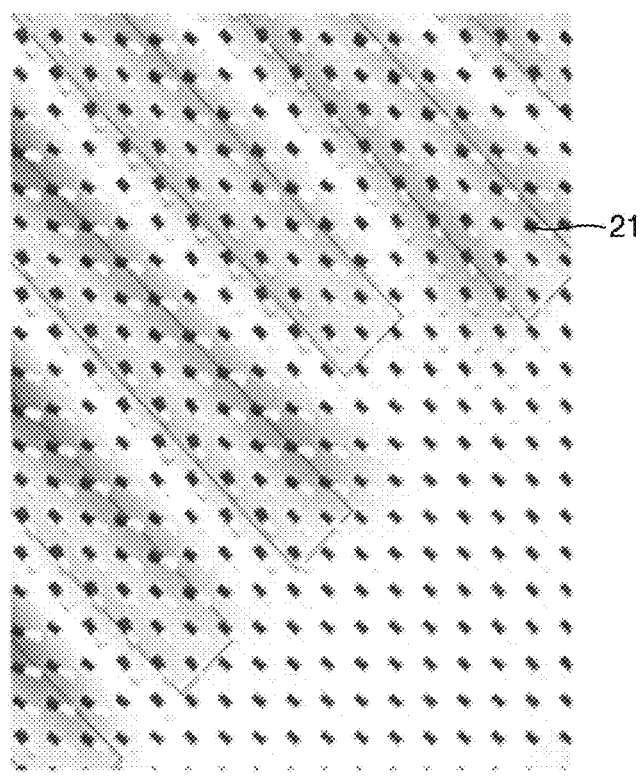

FIGS. 5A to 5C illustrate a liquid crystal (LC) director alignment change according to whether a voltage is applied when the electrode structure of FIG. 2 is provided.

FIG. 5A illustrates a case where an electric field is not formed in the liquid crystal layer 20 since no voltage is applied between the pixel electrode 50 and the common electrode 70. When no voltage is applied, the liquid crystal 21 is in a vertically aligned mode.

FIGS. 5B and 5C illustrate a case where an electric field is formed in the liquid crystal layer 20 since a voltage is applied between the pixel electrode 50 and the common electrode 70. FIG. 5B illustrates the arrangement of the LC director at an initial control stage, and FIG. 5C illustrates the arrangement of the LC director that is finally controlled.

As may be seen from FIGS. 5B and 5C, by partially extending the plate electrode 51 in the shape of stepping stones, since a fringe field is additionally generated between a partial extension portion of the plate electrode 51 and an adjacent slit region, liquid crystal control is facilitated and thus response time delay does not occur. That is, due to a fringe field effect generated in the first and second partial extension structures 60 and 65 of the plate electrode 51, response time delay does not occur even when the liquid crystal control length is increased. Thus, by applying the first and second partial extension structures 60 and 65 of the plate electrode 51, the liquid crystal control length may be ensured without response time delay, and the transmittance may be improved by the replacement of a portion of the minute branch electrodes 55 and 57 with the plate electrode 51.

Figure 6:
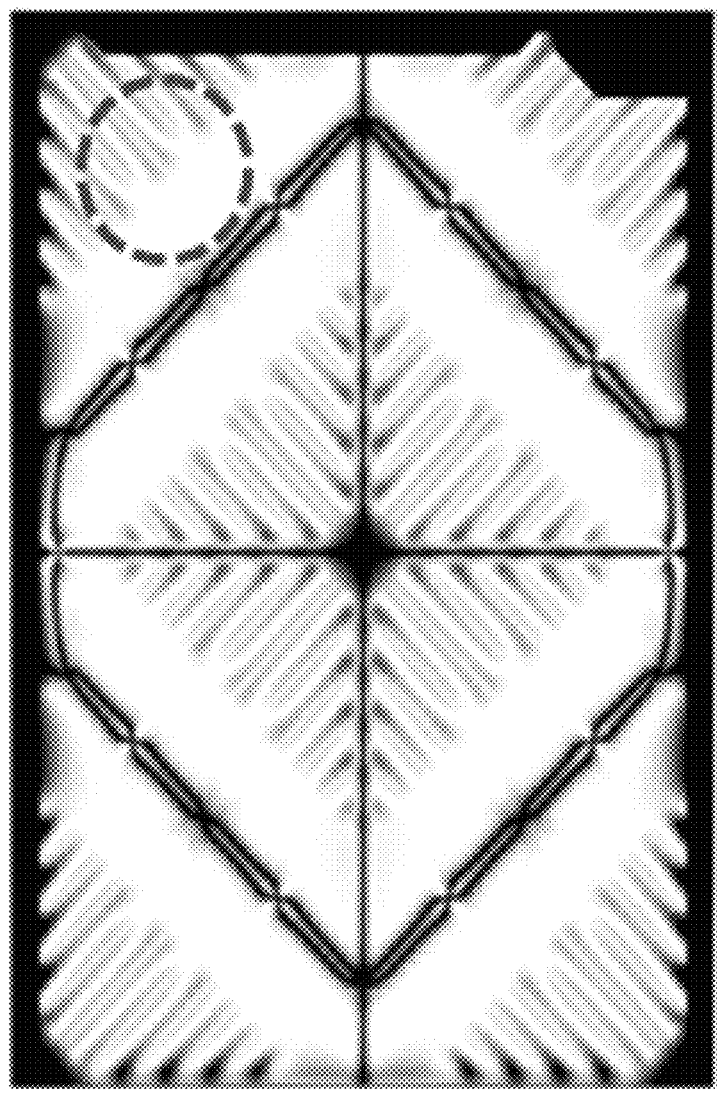
FIG. 6 illustrates a light-transmitted image in the electrode structure of FIG. 2.
Figure 7:
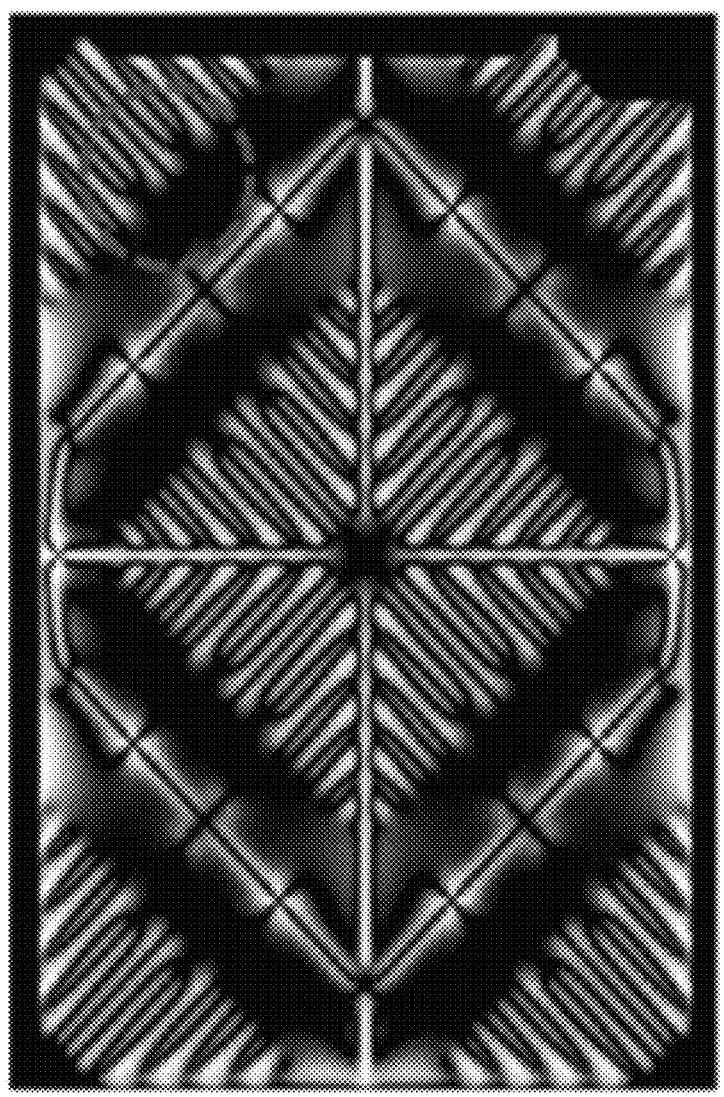
FIG. 7 illustrates a light-blocked image in the electrode structure of FIG. 2.

FIG. 6 illustrates a light-transmitted image in the electrode structure of FIG. 2, and FIG. 7 illustrates a light-blocked image in the electrode structure of FIG. 2. As may be seen from FIGS. 6 and 7, when first and second the partial extension structures 60 and 65 of the plate electrode 51 are formed in the partial boundary region located between the plate electrode 51 and the plurality of minute branch electrodes 55 and 57, the transmittance may be further improved and light blocking may be sufficiently performed, as indicated by a dotted circle portion.

Figure 8:
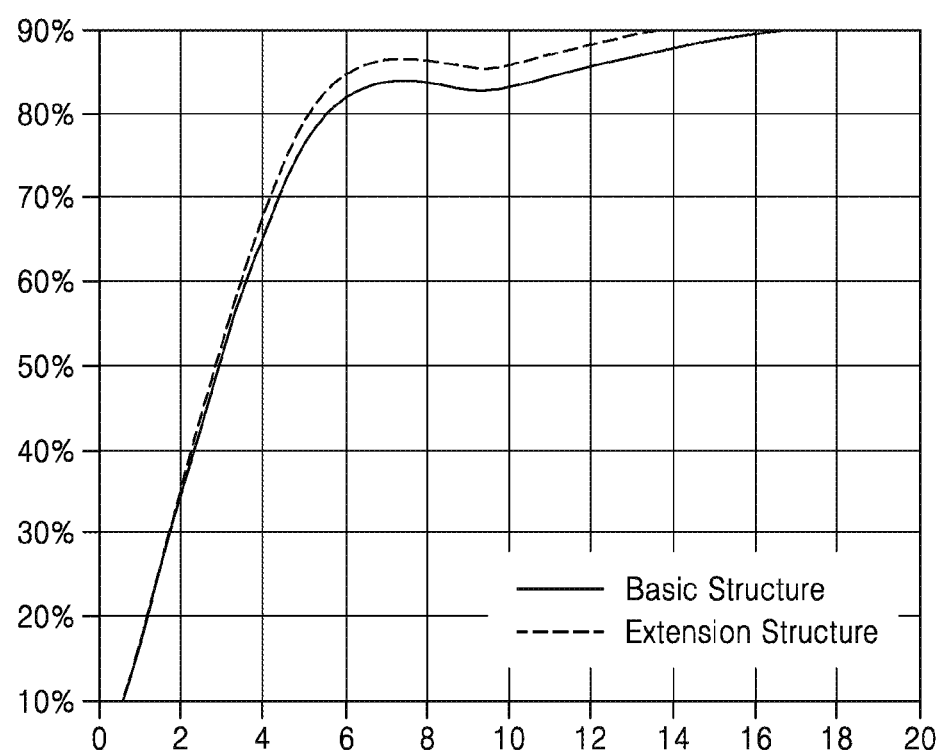
FIG. 8 illustrates a comparison between the response waveforms of a basic structure and a partial extension structure of a plate electrode.
Figure 9:
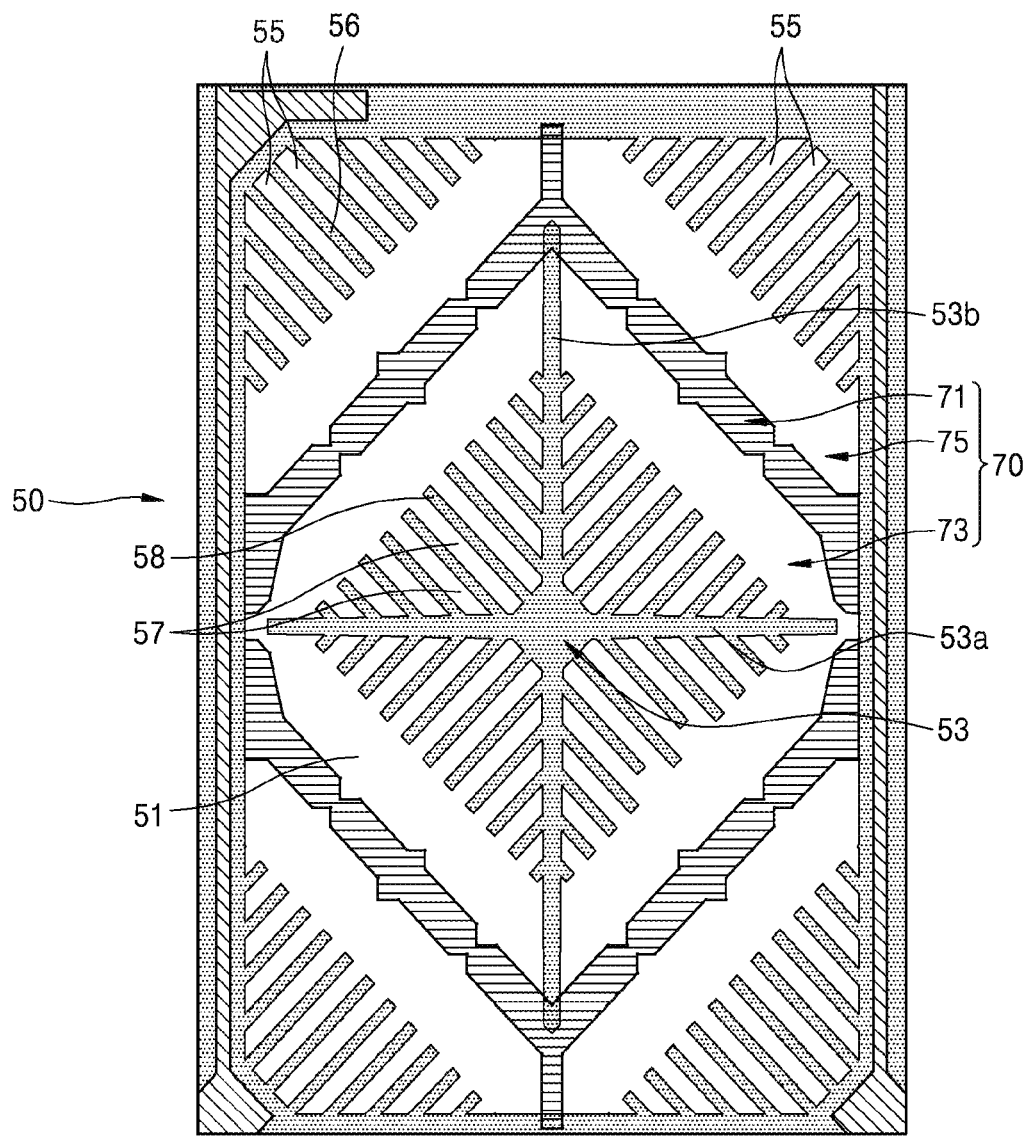
FIG. 9 illustrates an electrode structure as a comparative example when there is no partial extension of the plate electrode in the electrode structure of FIG. 2.

FIG. 8 illustrates a comparison between the response waveforms of a basic structure and the partial extension structure of the plate electrode. Herein, the response waveform of the partial extension structure of the plate electrode corresponds to the response waveform of the LC director depending on voltage application when the pixel electrode 50 and the common electrode 70 of FIG. 2 are provided. The response waveform of the basic structure corresponds to the response waveform of the LC director depending on voltage application when an electrode structure of FIG. 9 is provided as a structure in which there is no partial extension of the plate electrode 51. FIG. 9 illustrates an electrode structure as a comparative example when there is no partial extension of the plate electrode 51 in the electrode structure of FIG. 2.

As may be seen from the response waveforms of the basic structure and the extension structure of FIG. 8, response time delay does not occur even when the liquid crystal control length is increased by extending the plate electrode 51.

The case, in which the cross pattern 53 is formed at the center of the plate electrode 51, the plurality of first minute branch electrodes 55 extend outward from the plate electrode 51, and the plurality of second minute branch electrodes 57 extend inward from the plate electrode 51 and up to the cross pattern 53, has been described above as an example. However, the liquid crystal display according to an embodiment of the present invention may also have an electrode structure illustrated in FIG. 10.

Figure 10:
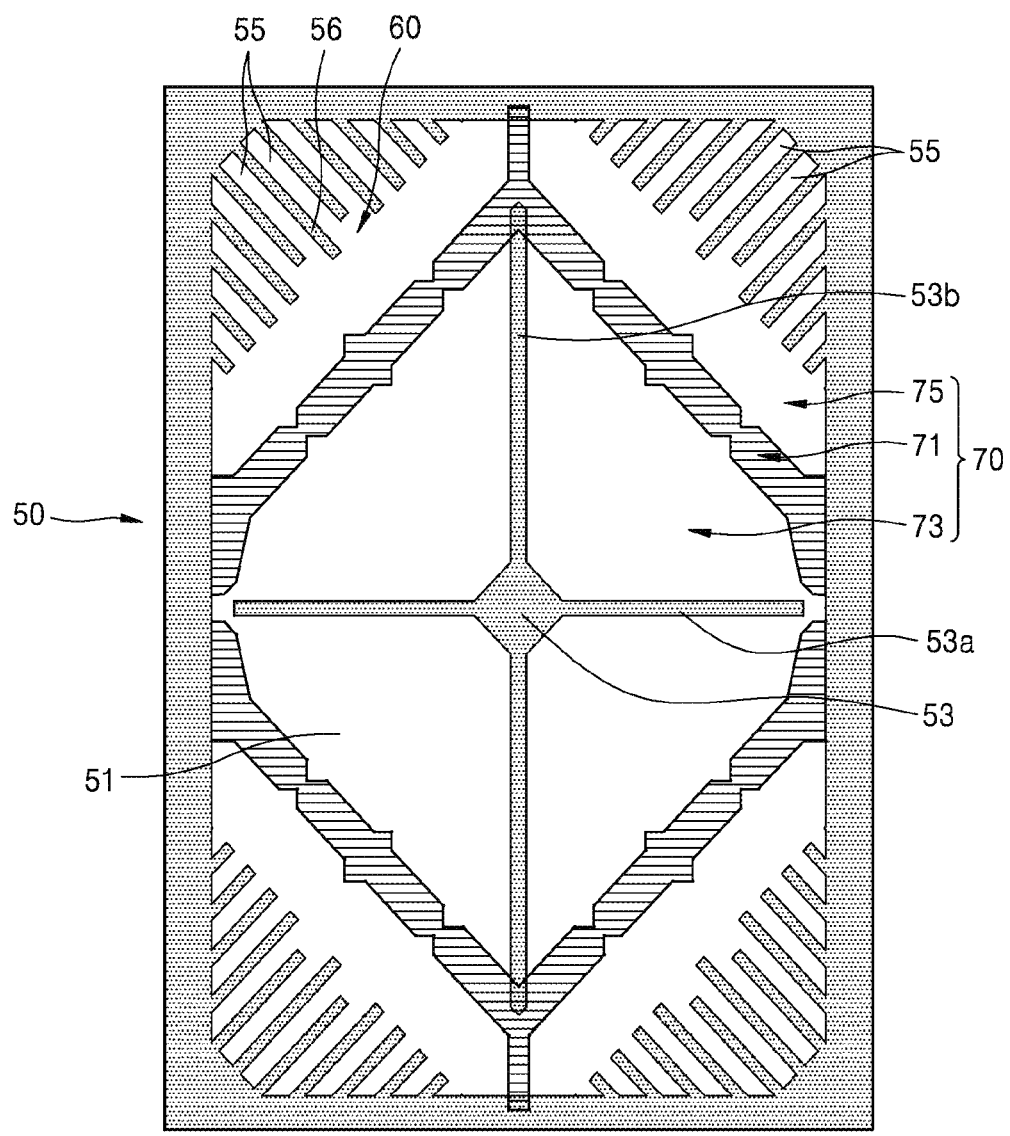
FIG. 10 illustrates an electrode structure of a liquid crystal display according to another embodiment of the present invention.

FIG. 10 illustrates an electrode structure of a liquid crystal display according to another embodiment of the present invention. In FIG. 10, the plurality of second minute branch electrodes 57, which extend inward from the plate electrode 51 and up to the cross pattern 53, are not provided unlike in FIG. 2.

Referring to FIG. 10, the pixel electrode 50 may include: a cross pattern 53 at a center thereof; a plate electrode 51 surrounding the cross pattern 53; and a plurality of first minute branch electrodes 55 extending in a diagonal direction from the plate electrode 51. In this case, a first partial extension structure 60 of the plate electrode 51 may be formed in at least a partial boundary region located between the plate electrode 51 and the plurality of first minute branch electrodes 55. The common electrode 70 may include a slit pattern 71 that is formed with a smaller width than the plate electrode 51 at a position corresponding to the plate electrode 51 of the pixel electrode 50.

Figure 11:
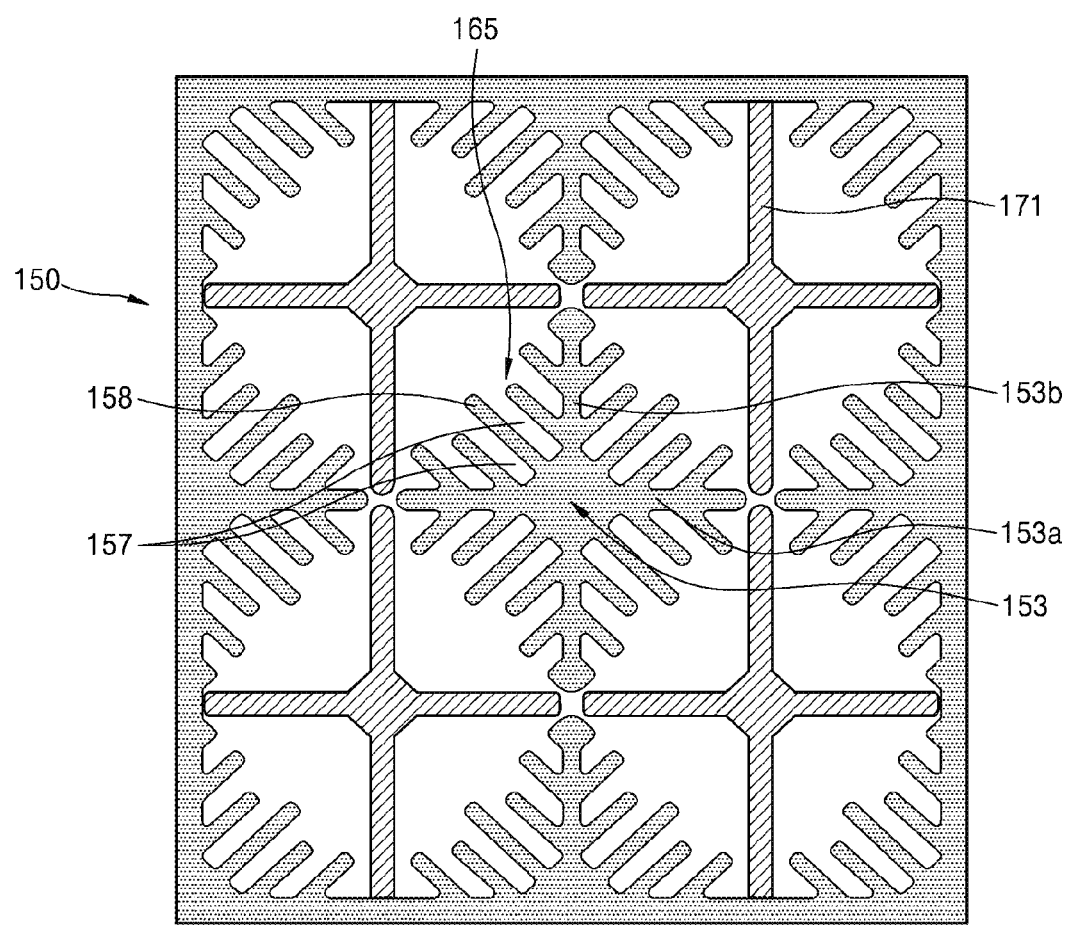
FIG. 11 illustrates an electrode structure of a liquid crystal display according to another embodiment of the present invention.

FIG. 11 illustrates an electrode structure of a liquid crystal display according to another embodiment of the present invention. FIG. 11 illustrates an example in which a pixel electrode 150 has a structure in which a slit cross pattern 153 is repeated to form a plurality of minute branch electrodes 157 and a partial extension structure 165 of a plate electrode 151 is formed in a partial boundary region located between the plate electrode 151 and the plurality of minute branch electrodes 157, and a common electrode has a structure in which a cross slit 171 deviating from the slit cross pattern 153 of the pixel electrode 150 is repeatedly formed. In this case, a horizontal slit 153a and a vertical slit 153b cross each other in the slit cross pattern 153, and a slit 158 extends in a diagonal direction from the horizontal slit 153a and the vertical slit 153b, thereby forming the plurality of minute branch electrodes 157.

As illustrated in FIG. 11, the partial extension structure 165 of the plate electrode 151 may also be applied to various structures of the pixel electrode 150 and the common electrode.

In the liquid crystal display, in order to approximate side visibility to front visibility, a pixel may be divided into, for example, two subpixels and different voltages may be applied to the two subpixels to be unlike the transmittance. The partial extension structure of the plate electrode 51 according to an embodiment of the present invention may also be applied to a structure in which a pixel is divided into two subpixels as illustrated in FIG. 12.

Figure 12:
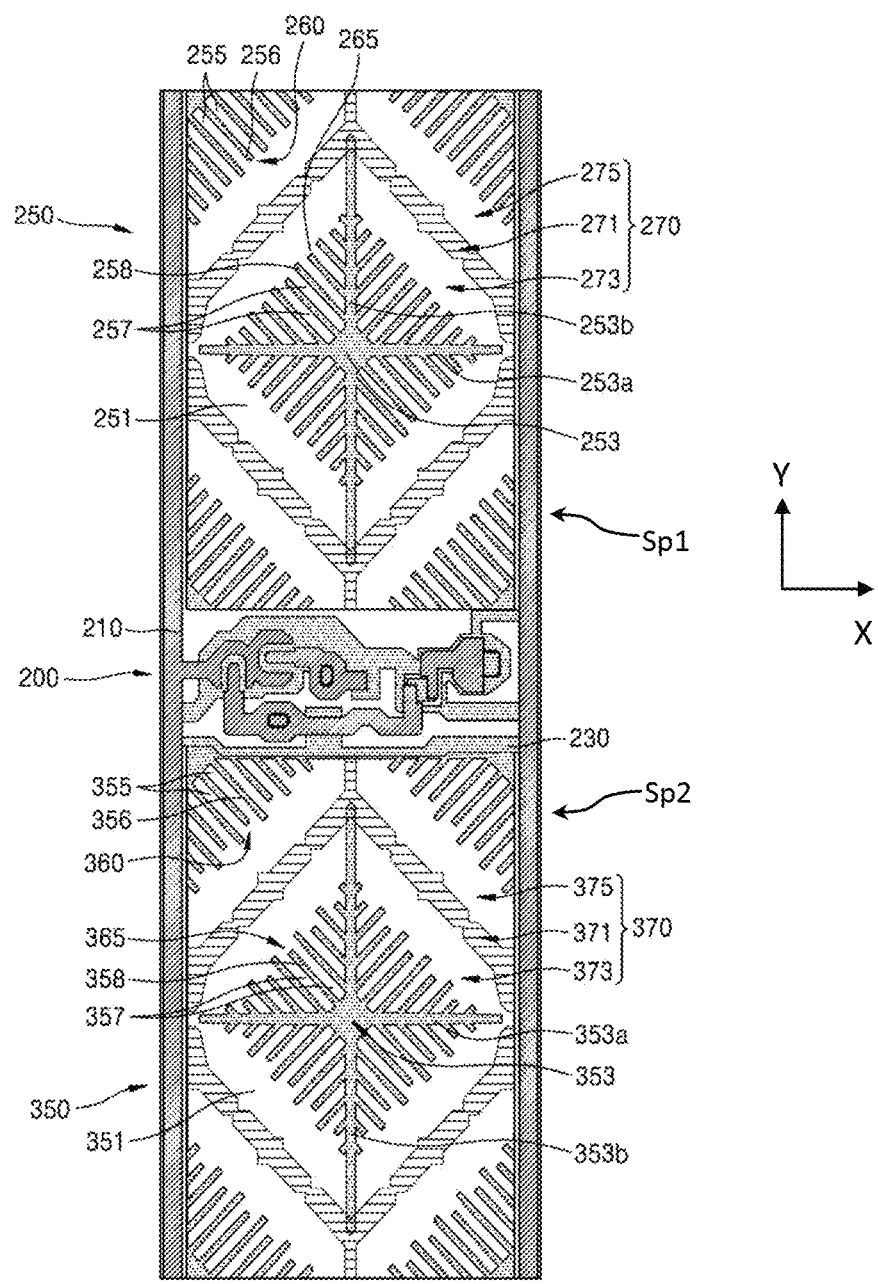
FIG. 12 illustrates a pixel structure of a liquid crystal display according to another embodiment of the present invention.

FIG. 12 illustrates a pixel structure of a liquid crystal display according to another embodiment of the present invention.

Referring to FIG. 12, a pixel region may include a first subpixel region Sp1 and a second subpixel region Sp2. A switching driving unit 200 may be disposed between the first subpixel region Sp1 and the second subpixel region Sp2. A gate line 230 may extend in a horizontal direction, that is, an x direction and may be connected to a gate of the switching driving unit 200 to transmit a gate signal. A data line 210 may extend in a vertical direction, that is, a y direction and may be connected to a source of the switching driving unit 200 to transmit a data signal.

The pixel electrode and the common electrode according to the above-described embodiments may be formed in each of the first subpixel region Sp1 and the second subpixel region Sp2. FIG. 12 illustrates an example in which the electrode structure of FIG. 2 is applied to the first subpixel region Sp1 and the second subpixel region Sp2. The electrode structures of FIGS. 10 and 11 may be applied to the first subpixel region Sp1 and the second subpixel region Sp2.

Referring to FIGS. 1 and 12, for example, in the first subpixel region Sp1, a pixel electrode 250 may be disposed on the lower substrate 10 and a common electrode 270 may be disposed on the upper substrate 30. The pixel electrode 250 includes: a cross pattern 253 at a center thereof; a plate electrode 251 surrounding the cross pattern 253; and a plurality of minute branch electrodes 255 and 257 extending in a diagonal direction from the plate electrode 251. Partial extension structures 260 and 265 of the plate electrode 251 may be formed in at least partial boundary regions between the plate electrode 251 and the plurality of minute branch electrodes 255 and 257. The common electrode 270 may include a slit pattern 271 that is formed with a smaller width than the plate electrode 251 at a position corresponding to the plate electrode 251 of the pixel electrode 250. The cross pattern 253 may be formed to have a structure in which a horizontal slit 253a and a vertical slit 253b cross each other. The partial extension structures 260 and 265 of the plate electrode 251 may be formed in shape of stepping stones, and one or more slits 256 and 258 may be located between the partial extension structures 260 and 265. The common electrode 270 may include a common electrode portion 273 having a substantially diamond shape and located inside the slit pattern 271 and a common electrode portion 275 located outside the slit pattern 271.

Also, in the second subpixel region Sp2, a pixel electrode 350 may be disposed on the lower substrate 10 and a common electrode 370 may be disposed on the upper substrate 30. The pixel electrode 350 includes: a cross pattern 353 at a center thereof; a plate electrode 351 surrounding the cross pattern 353; and a plurality of minute branch electrodes 355 and 357 extending in a diagonal direction from the plate electrode 351. Partial extension structures 360 and 365 of the plate electrode 351 may be formed in at least partial boundary regions between the plate electrode 351 and the plurality of minute branch electrodes 355 and 357. The common electrode 370 may include a slit pattern 371 that is formed with a smaller width than the plate electrode 351 at a position corresponding to the plate electrode 351 of the pixel electrode 350. The cross pattern 353 may be formed to have a structure in which a horizontal slit 353a and a vertical slit 353b cross each other. The partial extension structures 360 and 365 of the plate electrode 351 may be formed in shape of stepping stones, and one or more slits 356 and 358 may be located between the partial extension structures 360 and 365. The common electrode 370 may include a common electrode portion 371 having a substantially diamond shape and located inside the slit pattern 371 and a common electrode portion 375 located outside the slit pattern 371.

The first subpixel region Sp1 may be formed to be smaller than the second subpixel region Sp2. When a high voltage is applied in a vertically aligned structure of liquid crystal, response delay may occur in the plate electrode 251 due to the realignment of the LC director. Therefore, the partial extension structures 260 and 265 of the plate electrode 251 of the first subpixel region Sp1 may be formed to be smaller than the partial extension structures 360 and 365 of the plate electrode 351 of the second subpixel region Sp2, to prevent response time delay in the first subpixel region Sp1.

Figure 13A:
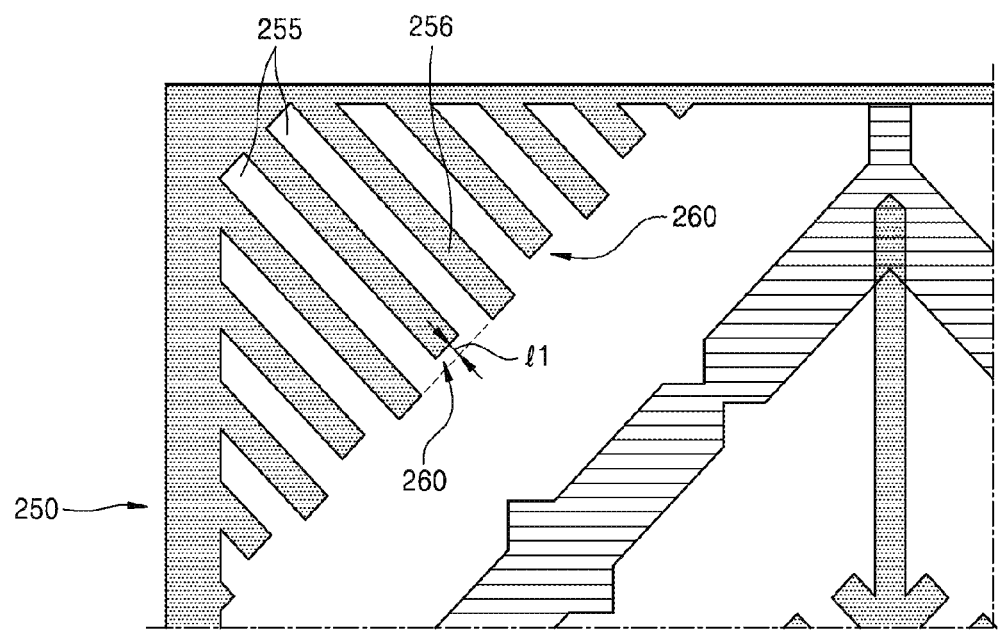
FIG. 13A is a partial enlarged view of a first subpixel region of FIG. 12.
Figure 13B:
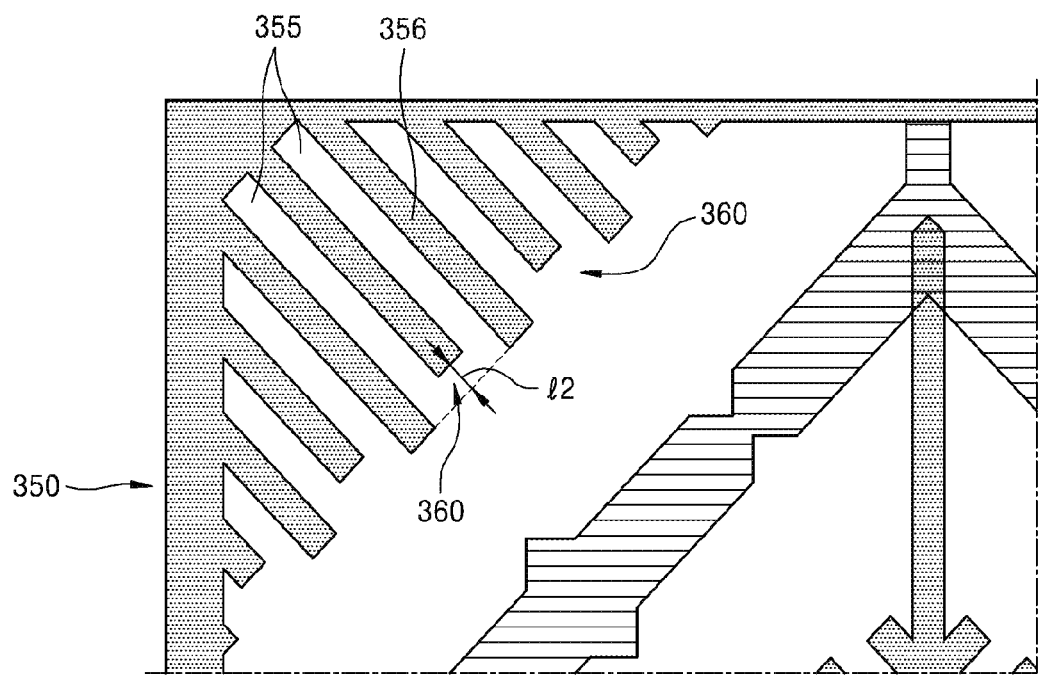
FIG. 13B is a partial enlarged view of a second subpixel region of FIG. 12.

Referring to FIGS. 13A and 13B, when L1 denotes the extended distance of the partial extension structures 260 and 265 of the plate electrode 251 of the first subpixel region Sp1 and L2 denotes the extended distance of the partial extension structures 360 and 365 of the plate electrode 351 of the second subpixel region Sp2, it may be formed to satisfy L1<L2. For example, L1 may be about 1.5 μm or less, and L2 may be 3.0 μm or less.

The electrode structures of the liquid crystal display according to the embodiments of the present invention, in which the partial extension structures of the plate electrode are formed in the partial boundary regions between the plate electrode and the minute branch electrodes, have been described above with reference to FIGS. 2, 10, 11, and 12. However, embodiments of the present invention are not limited thereto, and the partial extension structures of the plate electrode may also be applied to any electrode structure having various minute branch electrodes.

As described above, in the liquid crystal displays according to the one or more of the above embodiments of the present invention, since the partial extension structure of the plate electrode is formed in at least a partial boundary region located between the plate electrode and the minute branch electrode, the transmittance may be improved and the liquid crystal control length may be extended without response time delay of the liquid crystal.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A liquid crystal display device, comprising:
a pair of substrates; and
a pixel electrode and a common electrode provided on the pair of substrates and facing each other,
the pixel electrode comprising:
   a cross pattern including a vertical pattern and a horizontal pattern crossing each other formed at a center of the pixel electrode, said cross pattern being either empty or filled with an electrically insulating material;
   a plate electrode completely surrounding the cross pattern; and
   a plurality of minute branch electrodes extending in a diagonal direction from the plate electrode,
wherein:
   a partial extension structure of the plate electrode is formed in at least a partial boundary region located between the plate electrode and the plurality of minute branch electrodes;
   the common electrode comprises a slit pattern that is formed with a smaller width than the plate electrode at a position corresponding to the plate electrode; and
   the cross pattern divides one pixel area into four quadrants, wherein, within each quadrant, all of the minute branch electrodes extend in parallel to each other.

2. The liquid crystal display device of claim 1, wherein the partial extension structure of the plate electrode is formed by partially extending the plate electrode in a shape of stepping stones.

3. The liquid crystal display device of claim 2, wherein the partial extension structure of the plate electrode is formed by partially extending the plate electrode toward at least one slit which is interposed between two of the plurality of minute branch electrodes.

4. The liquid crystal display device of claim 1, wherein the partial extension structure of the plate electrode is formed in a region where the plurality of minute branch electrodes have a maximum length.

5. The liquid crystal display device of claim 1, wherein the plurality of minute branch electrodes extend outward from the plate electrode or extend inward from the plate electrode and up to the cross pattern.

6. The liquid crystal display device of claim 1, wherein the plurality of minute branch electrodes comprise:
   a plurality of first minute branch electrodes extending outward from the plate electrode; and
   a plurality of second minute branch electrodes extending inward from the plate electrode and up to the cross pattern,
   wherein the partial extension structure of the plate electrode is formed in at least a partial boundary region located between the plate electrode and at least one of the plurality of first minute branch electrodes and at least one of the plurality of second minute branch electrodes.

7. The liquid crystal display device of claim 6, wherein an electrode portion formed inside the slit pattern has a diamond shape.

8. The liquid crystal display device of claim 6, wherein a distance between the slit pattern of the common electrode and a boundary between the plate electrode and the plurality of minute branch electrodes is about 15 μm to about 30 μm.

9. The liquid crystal display device of claim 6, wherein the slit pattern is formed such that portions of the slit pattern have different widths.

10. The liquid crystal display device of claim 1, wherein the plurality of minute branch electrodes are formed to have a length of about 30 μm or less.

11. The liquid crystal display device of claim 10, wherein the partial extension structure of the plate electrode is formed in a shape of stepping stones in a region where the plurality of minute branch electrodes have a length greater than about 29 μm.

12. The liquid crystal display device of claim 1, wherein
a first subpixel region and a second subpixel region are provided in a pixel region, and
the common electrode and the pixel electrode are formed in each of the first subpixel region and the second subpixel region.

13. The liquid crystal display device of claim 12, wherein
the first subpixel region is formed to be smaller than the second subpixel region, and
the partial extension structure of the plate electrode in the first subpixel region is smaller than the partial extension structure of the plate electrode in the second subpixel region.

14. The liquid crystal display device of claim 1, wherein each of the slit pattern and the plate electrode have a diamond shape having inner and outer edges that each forms an oblique angle with the vertical pattern and the horizontal pattern.

15. A liquid crystal display device, comprising:
a pair of substrates;
a pixel electrode disposed on one of the pair of substrates; and
a common electrode disposed on the other of the pair of substrates,
the pixel electrode comprising:
    a cross pattern including a vertical pattern and a horizontal pattern crossing each other formed at a center of the pixel electrode, the cross pattern being electrically insulating;
    a plate electrode completely surrounding the cross pattern;
    a plurality of slits formed in a diagonal direction outward from the plate electrode; and
    a plurality of first minute branch electrodes extending in a diagonal direction outward from the plate electrode,
wherein:
    a first partial extension structure of the plate electrode is formed in at least a partial boundary region located between the plate electrode and the plurality of first minute branch electrodes;
    the common electrode comprises a slit pattern that is formed with a smaller width than the plate electrode at a position corresponding to the plate electrode; and
    the cross pattern divides one pixel area into four quadrants, wherein, within each quadrant, all of the minute branch electrodes extend in parallel to each other.

16. The liquid crystal display device of claim 15, wherein the first partial extension structure of the plate electrode is formed in a region where the plurality of first minute branch electrodes have a maximum length.

17. The liquid crystal display device of claim 15, wherein the first partial extension structure of the plate electrode is formed by partially extending the plate electrode in a shape of stepping stones.

18. The liquid crystal display device of claim 15, wherein the first partial extension structure of the plate electrode is formed in a shape of stepping stones in a region where the plurality of first minute branch electrodes have a length greater than about 29 μm.

19. The liquid crystal display device of claim 15, wherein
the cross pattern is formed in a shape of a slit cross pattern,
a plurality of second minute branch electrodes are further formed to extend in a diagonal direction inward from the plate electrode and up to the cross pattern, and
a second partial extension structure of the plate electrode is formed at a boundary located between the plate electrode and the plurality of second minute branch electrodes.

* * * * *